US010818104B2

(12) United States Patent
Gordon et al.

(10) Patent No.: US 10,818,104 B2
(45) Date of Patent: Oct. 27, 2020

(54) SELF-DRIVING VEHICLE ROAD SAFETY FLARE DEPLOYING SYSTEM

(71) Applicant: International Business Machines Corporation, Armonk, NY (US)

(72) Inventors: Michael S. Gordon, Yorktown Heights, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/678,613

(22) Filed: Nov. 8, 2019

(65) Prior Publication Data

US 2020/0074765 A1 Mar. 5, 2020

Related U.S. Application Data

(63) Continuation of application No. 15/398,927, filed on Jan. 5, 2017, now Pat. No. 10,529,147.

(51) Int. Cl.
*G07C 5/00* (2006.01)
*G05D 1/04* (2006.01)
(Continued)

(52) U.S. Cl.
CPC ............ *G07C 5/008* (2013.01); *B64C 39/024* (2013.01); *B64D 1/02* (2013.01); *G05D 1/042* (2013.01);
(Continued)

(58) Field of Classification Search
CPC ...... G07C 5/008; G07C 5/0808; G05D 1/0088; G05D 1/042; G05D 1/0011; B64C 39/024; B64C 2201/141; B64C 2201/128
(Continued)

(56) References Cited

U.S. PATENT DOCUMENTS 6,969,185 B1   11/2005   Adair
8,152,325 B2   4/2012    McDermott
(Continued)

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Muhammad Shafi
(74) *Attorney, Agent, or Firm* — Law Office of Jim Boice

(57) ABSTRACT

A method deploys a remotely-maneuverable rolling platform from a faulty self-driving vehicle (SDV). The method detects a driving problem severity level for the faulty self-driving vehicle (SDV), where the driving problem severity level describes an amount of danger that is posed to other vehicles by the faulty SDV, and assesses environmental conditions at the location of the faulty SDV. The method determines an opportune position for deploying one or more road safety flares by the faulty SDV based on the environmental conditions at the location of the faulty SDV and the driving problem severity level, and then deploys a remotely-maneuverable rolling platform, from the faulty SDV to the opportune position, based on the amount of danger that is posed to the other vehicles by the faulty SDV, where the one or more road safety flares are coupled to the remotely-maneuverable rolling platform.

14 Claims, 9 Drawing Sheets

(51) Int. Cl.
  *G07C 5/08* (2006.01)
  *B64C 39/02* (2006.01)
  *B64D 1/02* (2006.01)

(52) U.S. Cl.
  CPC ...... *G07C 5/0808* (2013.01); *B64C 2201/128* (2013.01); *B64C 2201/141* (2013.01); *B64C 2201/146* (2013.01)

(58) Field of Classification Search
  USPC .......................................................... 701/2
  See application file for complete search history.

(56) References Cited

U.S. PATENT DOCUMENTS

| | | | |
|---|---|---|---|
| 8,706,394 | B2 | 4/2014 | Trepagnier et al. |
| 8,773,284 | B2* | 7/2014 | McDermott ............. B60Q 7/00 340/908 |
| 8,786,461 | B1* | 7/2014 | Daudelin ............... B60Q 7/005 340/815.45 |
| 8,810,392 | B1 | 8/2014 | Teller et al. |
| 8,923,890 | B1 | 12/2014 | White et al. |
| 9,218,698 | B2 | 12/2015 | Ricci |
| 9,286,520 | B1 | 3/2016 | Lo et al. |
| 9,381,915 | B1 | 7/2016 | Chombez et al. |
| 9,437,109 | B1* | 9/2016 | Stafford ..................... F21L 4/02 |
| 9,552,735 | B2 | 1/2017 | Pilutti et al. |
| 9,566,958 | B2 | 2/2017 | Waldmann |
| 9,566,986 | B1 | 2/2017 | Gordon et al. |
| 9,628,975 | B1 | 4/2017 | Watkins et al. |
| 9,646,496 | B1 | 5/2017 | Miller |
| 9,718,468 | B2 | 8/2017 | Barfield et al. |
| 9,834,224 | B2 | 12/2017 | Gordon et al. |
| 2002/0026841 | A1 | 3/2002 | Svendsen |
| 2002/0128774 | A1 | 9/2002 | Takezaki et al. |
| 2004/0078133 | A1 | 4/2004 | Miller |
| 2004/0117086 | A1 | 6/2004 | Rao et al. |
| 2004/0199306 | A1 | 10/2004 | Helmann et al. |
| 2005/0021227 | A1 | 1/2005 | Matsumoto et al. |
| 2006/0163939 | A1 | 7/2006 | Kuramochi et al. |
| 2007/0124027 | A1 | 5/2007 | Betzitza et al. |
| 2008/0065293 | A1 | 3/2008 | Placke et al. |
| 2008/0288406 | A1 | 11/2008 | Seguin et al. |
| 2009/0138168 | A1 | 5/2009 | Labuhn et al. |
| 2010/0256852 | A1 | 10/2010 | Mudulige |
| 2011/0029173 | A1 | 2/2011 | Hyde et al. |
| 2011/0077807 | A1 | 3/2011 | Hyde et al. |
| 2011/0077808 | A1 | 3/2011 | Hyde et al. |
| 2012/0072243 | A1 | 3/2012 | Collins et al. |
| 2012/0293341 | A1 | 11/2012 | Lin |
| 2013/0113634 | A1 | 5/2013 | Hutchinson et al. |
| 2013/0131949 | A1 | 5/2013 | Shida |
| 2013/0144502 | A1 | 6/2013 | Shida |
| 2014/0032049 | A1 | 1/2014 | Moshchuk et al. |
| 2014/0092332 | A1 | 4/2014 | Price |
| 2014/0195213 | A1 | 7/2014 | Kozloski |
| 2014/0201126 | A1 | 7/2014 | Zadeh |
| 2014/0214260 | A1 | 7/2014 | Eckert et al. |
| 2014/0282967 | A1 | 9/2014 | Maguire |
| 2014/0316671 | A1 | 10/2014 | Okamoto |
| 2014/0330479 | A1 | 11/2014 | Dolgov |
| 2015/0062469 | A1 | 3/2015 | Fleury |
| 2015/0066282 | A1 | 3/2015 | Yopp |
| 2015/0088358 | A1 | 3/2015 | Yopp |
| 2015/0120331 | A1 | 4/2015 | Russo et al. |
| 2015/0137985 | A1 | 5/2015 | Zafiroglu et al. |
| 2015/0141043 | A1 | 5/2015 | Abramson |
| 2015/0149018 | A1 | 5/2015 | Attard et al. |
| 2015/0149021 | A1 | 5/2015 | Duncan et al. |
| 2015/0160019 | A1 | 6/2015 | Biswal et al. |
| 2015/0210280 | A1 | 7/2015 | Agnew et al. |
| 2015/0242953 | A1 | 8/2015 | Suiter |
| 2015/0293994 | A1 | 10/2015 | Kelly |
| 2016/0063761 | A1 | 3/2016 | Sisbot et al. |
| 2016/0090100 | A1 | 3/2016 | Oyama et al. |
| 2016/0202700 | A1 | 7/2016 | Sprigg |
| 2016/0205146 | A1 | 7/2016 | Sugioka et al. |
| 2016/0304122 | A1 | 10/2016 | Herzog et al. |
| 2016/0321921 | A1 | 11/2016 | Stafford et al. |
| 2016/0325835 | A1* | 11/2016 | Abuelsaad ............ B64C 39/024 |
| 2016/0344737 | A1 | 11/2016 | Anton |
| 2016/0355192 | A1 | 12/2016 | James et al. |
| 2016/0358477 | A1 | 12/2016 | Ansari |
| 2016/0364823 | A1 | 12/2016 | Cao |
| 2017/0001650 | A1 | 1/2017 | Park |
| 2017/0021837 | A1 | 1/2017 | Ebina |
| 2017/0057542 | A1 | 3/2017 | Kim et al. |
| 2017/0088143 | A1 | 3/2017 | Goldman-Shenhar et al. |
| 2017/0106876 | A1 | 4/2017 | Gordon et al. |
| 2017/0123428 | A1 | 5/2017 | Levinson et al. |
| 2017/0137023 | A1 | 5/2017 | Anderson et al. |
| 2017/0151958 | A1 | 6/2017 | Sakuma |
| 2017/0168689 | A1 | 6/2017 | Goldman-Shenhar et al. |
| 2017/0368689 | A1 | 6/2017 | Goldman-Shenhar et al. |
| 2017/0200449 | A1 | 7/2017 | Penilla et al. |
| 2017/0248949 | A1 | 8/2017 | Moran et al. |
| 2018/0032071 | A1* | 2/2018 | Wieneke ............... G05D 1/0038 |
| 2018/0075309 | A1 | 3/2018 | Sathyanarayana et al. |
| 2018/0093631 | A1 | 4/2018 | Lee et al. |
| 2018/0141453 | A1* | 5/2018 | High .................... G05D 1/0684 |
| 2018/0154906 | A1* | 6/2018 | Dudar ................. B60R 21/0136 |

OTHER PUBLICATIONS

Anonymous, "Marche Smart Flare Ultra Bright 360 Degree LED Emergency Flares—2 Pack". amazon.com, Web. Sep. 22, 2016. <https://www.amazon.com/MARCHE-BRIGHT-DEGREE-EMERGENCY-FLARES/DP/B00X7VIRAY>.

Anonymous, "pi-Lit® Ice Cream Sandwich—Sequencing Road Surface Flare". pivariables.com, Apr. 16, 2014. Web. Sep. 22, 2016. <https://www.google.com/search?q=PIVARIABLES%2FCOM% 2FICE-CREAM-SANDWICH-FLARE&ie=utf-8&oe=utf-8>.

IBM, "List of IBM Patents or Patent Applications Treated as Related", Nov. 8, 2019.

* cited by examiner

SELF-DRIVING VEHICLE ROAD SAFETY FLARE DEPLOYING SYSTEM

BACKGROUND

The present disclosure relates to the field of self-driving vehicles, and specifically to self-driving vehicles that are tasked with ameliorating roadway hazards. More specifically, the present disclosure relates to the use of a self-driving vehicle to deploy, from the self-driving vehicle and/or from an aerial drone, a road safety flare warning of the presence of a faulty SDV.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

An aerial drone, also known as an unmanned aerial vehicle (UAV) or a flying drone, is an unmanned airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

In one or more embodiments of the present invention, a method deploys a remotely-maneuverable rolling platform from a faulty self-driving vehicle (SDV). The method detects a driving problem severity level for the faulty self-driving vehicle (SDV), where the driving problem severity level describes an amount of danger that is posed to other vehicles by the faulty SDV, and assesses environmental conditions at the location of the faulty SDV. The method determines an opportune position for deploying one or more road safety flares by the faulty SDV based on the environmental conditions at the location of the faulty SDV and the driving problem severity level, and then deploys a remotely-maneuverable rolling platform, from the faulty SDV to the opportune position, based on the amount of danger that is posed to the other vehicles by the faulty SDV, where the one or more road safety flares are coupled to the remotely-maneuverable rolling platform.

The aforementioned method embodiment of one or more embodiments of the present invention is implemented as a system and/or computer program product in one or more other embodiments of the present invention.

DETAILED DESCRIPTION

Figure 1:
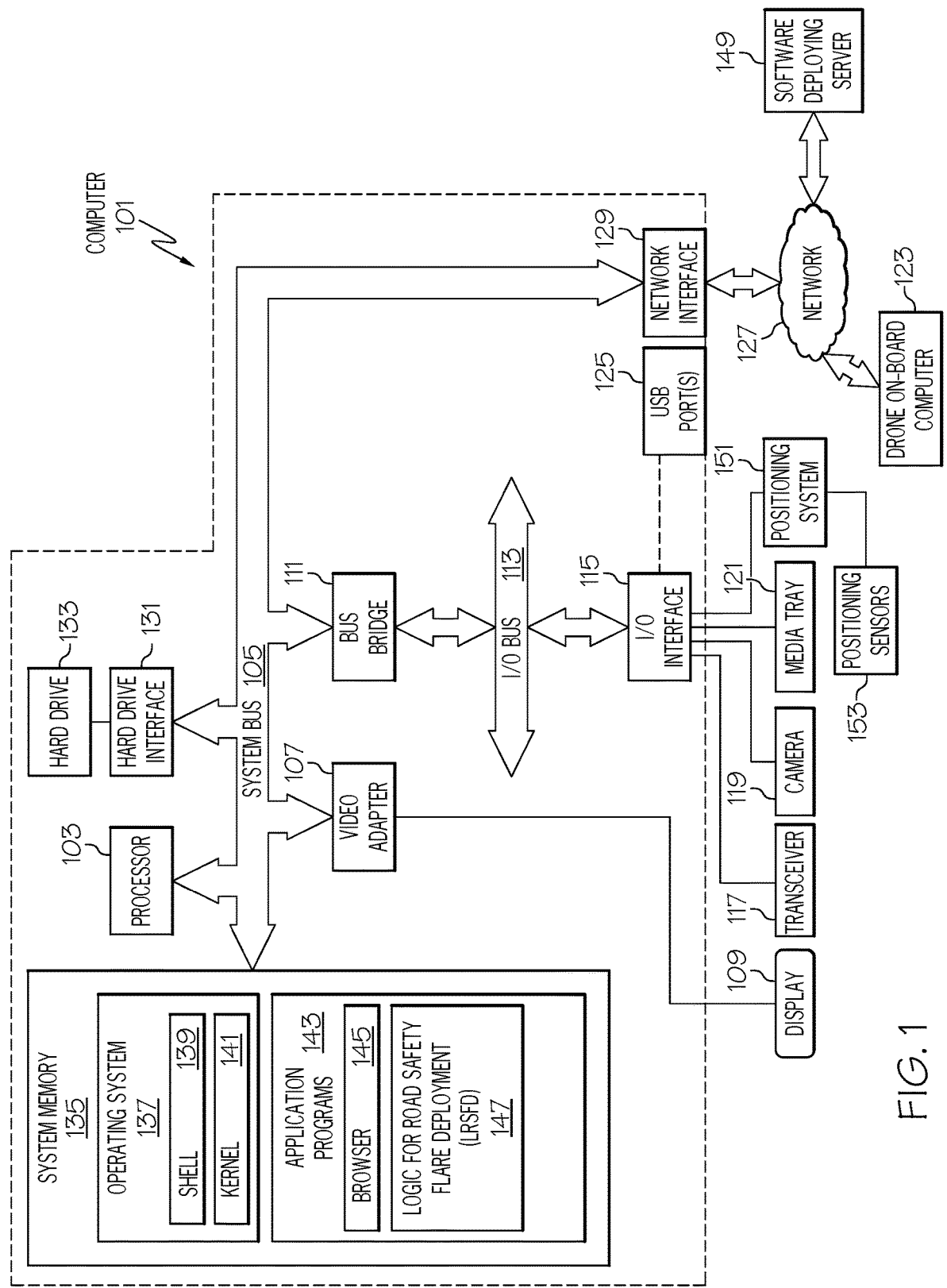
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151, and/or SDV/drone controller system 201 shown in FIG. 2, and/or SDV on-board computer 301 shown in FIG. 3, and/or drone on-board computer 423 and/or the road safety flare support system controller 424 shown in FIG. 4, and/or drone mechanisms controller 501 shown in FIG. 5, and/or road safety flare control logic 701 shown in FIG. 7.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a transceiver 117 (capable of transmitting and receiving electromagnetic transmissions), a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 and/or self-driving vehicle (SDV) 202 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is also able to communicate (besides via transceiver 117) with a software deploying server 149 and/or other devices/systems (e.g., drone on-board computer 123 and/or a software deploying server 149) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Road Safety Flare Deployment (LRSFD) 147. LRSFD 147 includes code for implementing the processes described below, including those described in FIGS. 2-6. In one embodiment, computer 101 is able to download LRSFD 147 from software deploying server 149, including in an on-demand basis. In one embodiment, software deploying server 149 is able to execute one or more instructions from LRSFD 147 and provide the results to computer 101, thus relieving computer 101 from the need to utilize its internal processing power.

The hardware elements depicted in computer 101 are not intended to be exhaustive, but rather are to highlight certain components used in some embodiments of the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
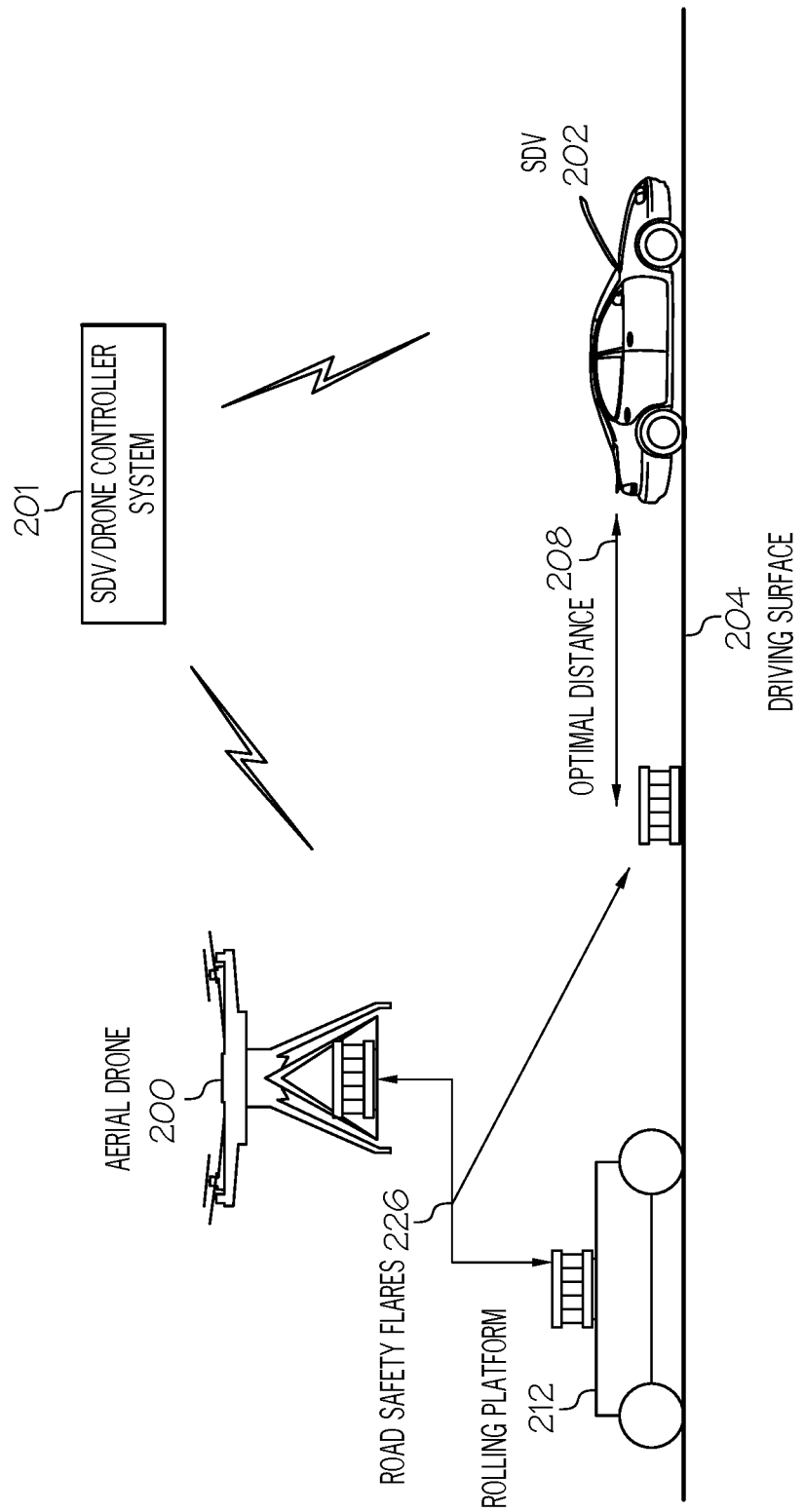
FIG. 2 depicts a self-driving vehicle (SDV) and/or aerial drone deploying a road safety flare near a faulty SDV on a roadway in accordance with one or more embodiments of the present invention.

With reference now to FIG. 2, assume that a faulty SDV 202 is disabled or otherwise operating in a diminished capacity while on a driving surface 204 (e.g., a roadway, a parking lot, etc.). Faulty SDV 202 (also referred to herein simply as SDV 202) thus poses a navigation/traffic hazard to other vehicles on the driving surface 204. Assume now that faulty SDV 202 experiences some type of mechanical problem, which causes it to lose power, and thus pulls over to the side of the driving surface 204 (e.g., onto a shoulder of the driving surface 204). As such, the present invention provides a system for deploying road safety flares 226 onto the driving surface 204 at a position that is an optimal distance 208 away from the faulty SDV 202. In one or more embodiments of the present invention, one or more of the road safety flares 226 are deployed directly from the faulty SDV 202 (i.e., are dropped onto the driving surface 204 as the faulty SDV 202 rolls to a stop). In one or more embodiments of the present invention, one or more of the road safety flares 226 are deployed from an aerial drone 200, under the direction/control of faulty SDV 202 and/or an SDV/drone controller system 201 shown in FIG. 2.

That is, in one embodiment the road safety flares 226 are deployed directly by the SDV 202. However, there may be occasions in which the faulty SDV 202 determines that it is unable to place the road safety flares 226 in the proper position (e.g., due to the incapacity or stopped position of the faulty SDV 202, due to current traffic conditions, due to icing/flooding conditions on the driving surface 204, due to a lack of power, etc.). As such, the SDV 202 may summon the aerial drone 200 to deliver and deploy the road safety flares 226. In one embodiment, the aerial drone 200 already is carrying the road safety flare(s) 226. However, in another embodiment, the aerial drone 200 will first pick up the needed road safety flare(s) 226 from the faulty SDV 202, which is likely to have a larger carrying capacity than the aerial drone 200.

In an embodiment of the present invention, the aerial drone 200 and/or the faulty SDV 202 are under the control of a remote SDV/drone controller system 201, which is able to communicate (e.g., via wireless transmissions) to the aerial drone 200 and/or faulty SDV 202.

In an embodiment of the present invention, the faulty SDV 202 operates autonomously when deploying one or more of the road safety flares 226 that are deployable and removably coupled to the faulty SDV 202.

In an embodiment of the present invention, the faulty SDV 202 controls the operation of the aerial drone 200, including positioning the aerial drone 200, directing the aerial drone 200 to deploy one or more of the road safety flares 226, etc.

In an embodiment of the present invention, the road safety flare 226 is mounted on a rolling platform 212, which is deployed from the faulty SDV 202 and/or the aerial drone 200. Within the rolling platform 212 are control systems, receivers, etc. that allow the faulty SDV 202 and/or SDV/drone controller system 201 to maneuver the rolling platform 212 to an opportune position. That is, the rolling platform 212 may include a remote control, powered wheels, and a transceiver capable of receiving a signal from faulty SDV 202 to position the rolling platform 212 at the opportune position for one or more of the road safety flares 226 to be visible to other vehicles.

Figure 3:
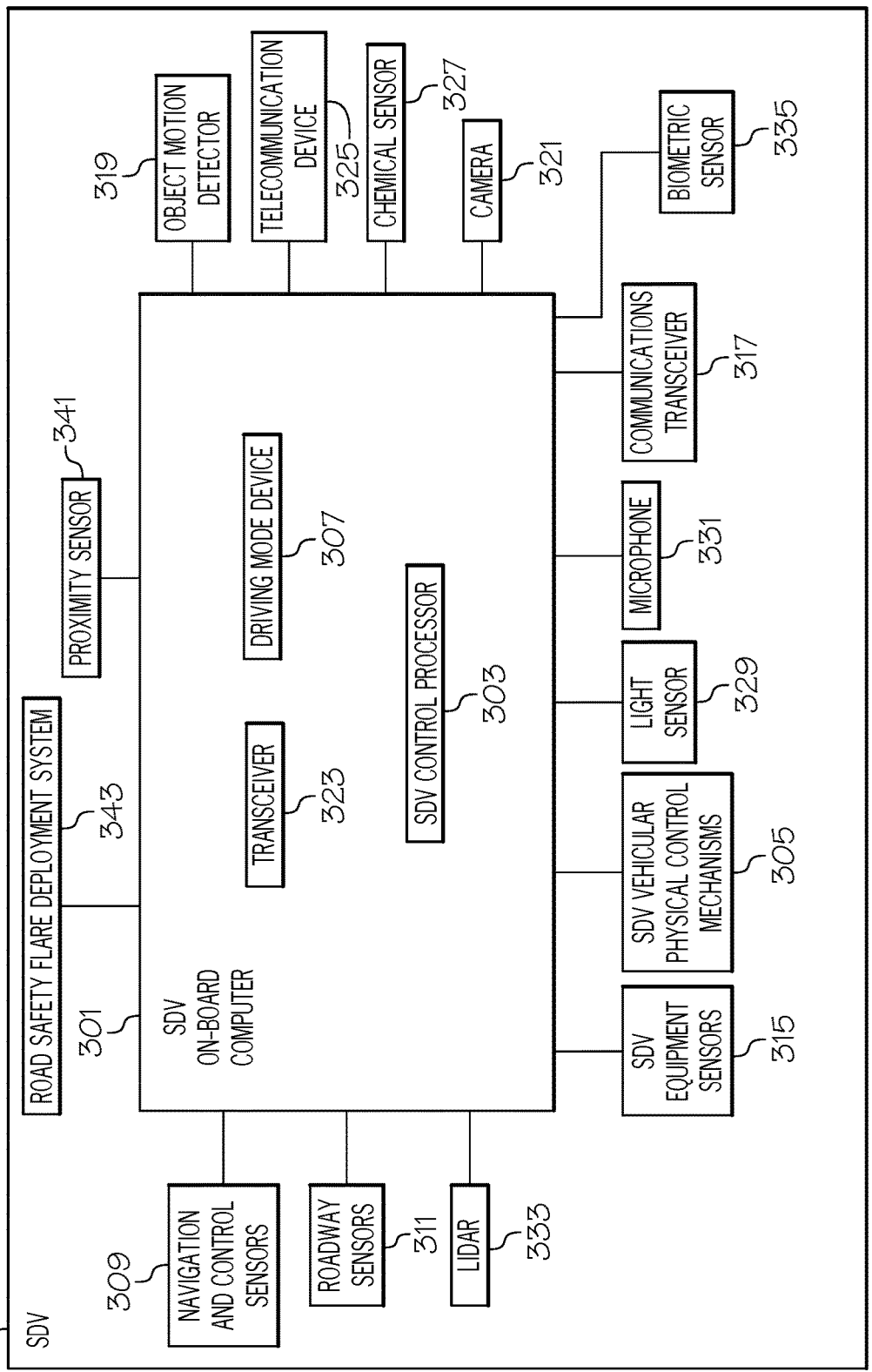
FIG. 3 illustrates additional hardware detail of the SDV shown in FIG. 2 in accordance with one or more embodiments of the present invention.

With reference now to FIG. 3, additional details of one or more embodiments of the faulty SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

Similarly, a dedicated camera 321 can be trained on roadway 204, in order to provide photographic images of conditions on the roadway 204 upon which the SDV 202 is traveling.

Similarly, a dedicated object motion detector 319 (e.g., a radar transceiver capable of detecting Doppler shifts indicative of the speed and direction of movement of other vehicles, animals, persons, etc. on the roadway 204) can be trained on the roadway 204 upon which the SDV 202 is traveling.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication— NFC connection) to the SDV on-board computer 301.

In one or more embodiments of the present invention, also within SDV 202 is a biometric sensor 335, which may be a camera that captures and analyzes certain facial expressions and/or body language (indicative of an anxious state), a respiration monitor (capturing shallow breathing, indicative of the anxious state), a blood pressure monitor (capturing high blood pressure, indicative of the anxious state), etc.

In one or more embodiments of the present invention, also within SDV 202 is a proximity sensor 341, which uses motion detectors, radar (using Doppler shifting logic), etc. that detect an object (e.g., a vehicle in a next lane) near SDV 202.

In one or more embodiments of the present invention, also within SDV 202 is a road safety flare deployment system 343, which is a system that is able to 1) hold a road safety flare, 2) activate the road safety flare (e.g., pull a fuse tape on a pyrotechnic flare), and/or 3) deploy (e.g., drop onto a roadway) the road safety flare (as directed by the SDV on-board computer 301).

Figure 4:
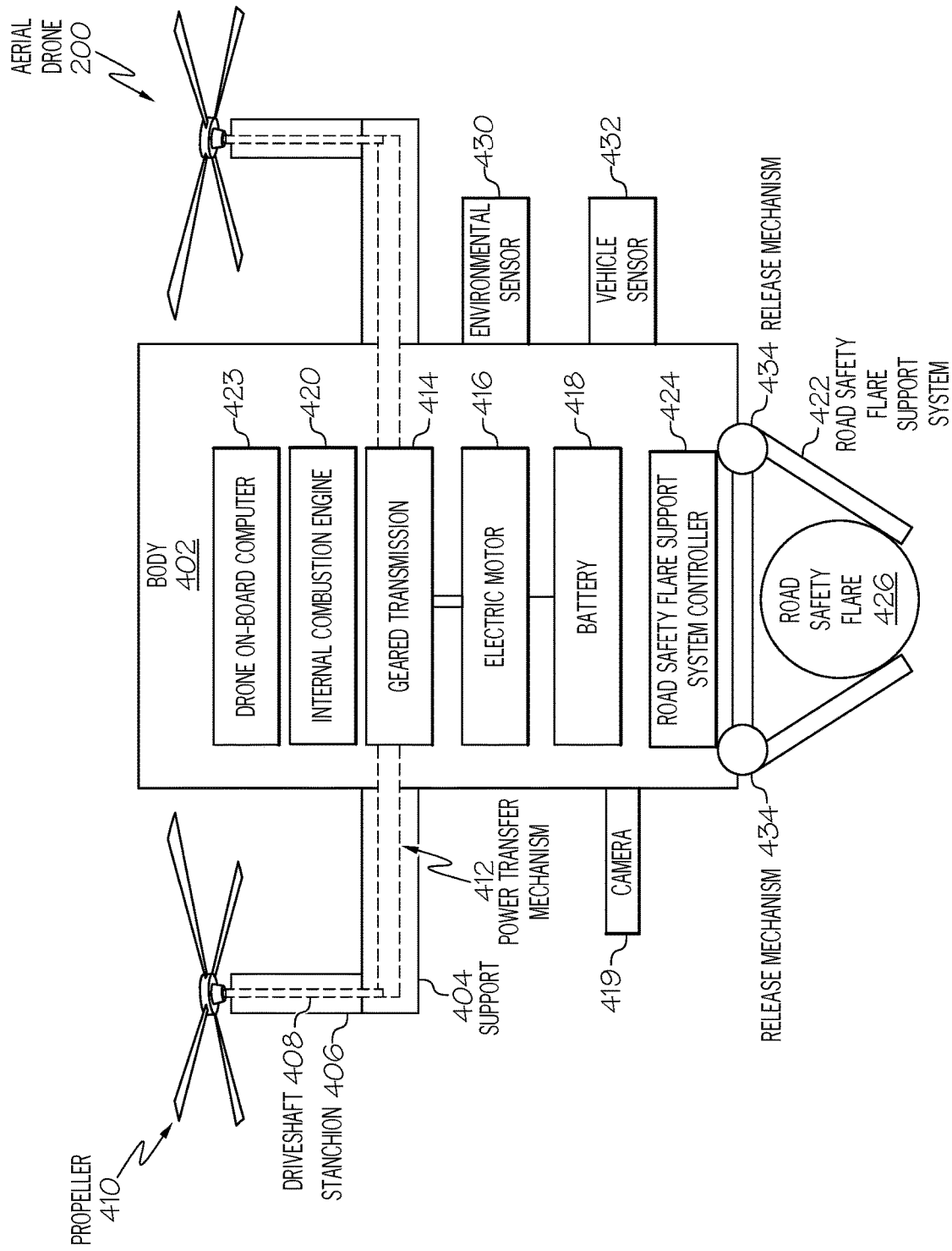
FIG. 4 depicts detail of the exemplary aerial drone shown in FIG. 2 as used in accordance with one or more embodiments of the present invention.

With reference now to FIG. 4, details of the aerial drone 200 shown in FIG. 2 are presented in accordance with one or more embodiments of the present invention. The terms "aerial drone", "drone", and "unmanned aerial vehicle"

("UAV") are used interchangeably herein to identify and describe an airborne vehicle that is capable of pilot-less flight.

As shown in FIG. 4, aerial drone 200 includes a body 402, which is attached to supports such as support 404. Supports such as support 404 support stanchions such as stanchion 406. Such stanchions provide a housing for a driveshaft within each of the stanchions, such as the depicted driveshaft 408 within stanchion 406. These driveshafts are connected to propellers. For example, driveshaft 408 within stanchion 406 is connected to propeller 410.

A power transfer mechanism 412 (e.g., a chain, a primary driveshaft, etc.) transfers power from a geared transmission 414 to the driveshafts within the stanchions (e.g., from geared transmission 414 to the driveshaft 408 inside stanchion 406), such that propeller 410 is turned, thus providing lift and steering to the aerial drone 400. Geared transmission 414 preferably contains a plurality of gears, such that a gear ratio inside geared transmission 414 can be selectively changed.

Power to the geared transmission 414 is selectively provided by an electric motor 416 (which is supplied with electrical power by a battery 418) or an internal combustion engine 420, which burns fuel from a fuel tank (not shown). In one or more embodiments of the present invention, the internal combustion engine 420 has greater power than the electric motor 416, since internal combustion engines are able to produce greater torque/power and have a greater range (can fly farther) than electric motors of the same size/weight.

Affixed to body 402 is a road safety flare support system 422 that holds one or more road safety flares, including the depicted road safety flare 426. Road safety flare support system 422 includes release mechanisms 434 (e.g., gears, hinges, etc. whose movement is controlled by the road safety flare support system controller 424) that allow the aerial drone 200 to pick up (take on board) and release (drop/deploy) the road safety flare 426.

Road safety flare 426 may be an electronic road safety device, a pyrotechnic device, etc. Furthermore, in one or more embodiments a control device (not shown) may be affixed to road safety flare 426. For example, a remotely controlled device may be able to pull the fuse tape off a pyrotechnic device, turn off, on, speed up, etc. battery-powered lights in an electronic road safety device, etc.

Also affixed to body 402 is a camera 419 (analogous to camera 119 shown in FIG. 1), which is able to take digital still and moving pictures under the control of the drone on-board computer 423.

Also affixed to body 402 is an environmental sensor 430, which is communicatively coupled to drone on-board computer 423. Environmental sensor 430 detects ambient conditions around the aerial drone 200. For example, environmental sensor 430 may be a light sensor that detects ambient lighting conditions; environmental sensor 430 may be a weather sensor that detects ambient weather conditions such as rain, snow, fog, etc. using one or more of a thermometer, barometer, microphone camera, moisture detector, etc.; environmental sensor 430 may be a traffic sensor that detects ambient traffic conditions using a light sensor (for detecting oncoming headlights), a microphone (for detecting the sound of traffic), a camera (for photographing local traffic), etc.

Also affixed to aerial drone 200 is a vehicle sensor 432. While environmental sensor 430 can detect traffic conditions (i.e., general pattern of local traffic), vehicle sensor 432 detects an individual oncoming vehicle and its state. For example, vehicle sensor 432 may be a Doppler-enabled transceiver that sends and receives an electromagnetic signal towards an oncoming vehicle (which is detected by camera 419), in order to detect the speed, direction, and current location of the oncoming vehicle.

Figure 5:
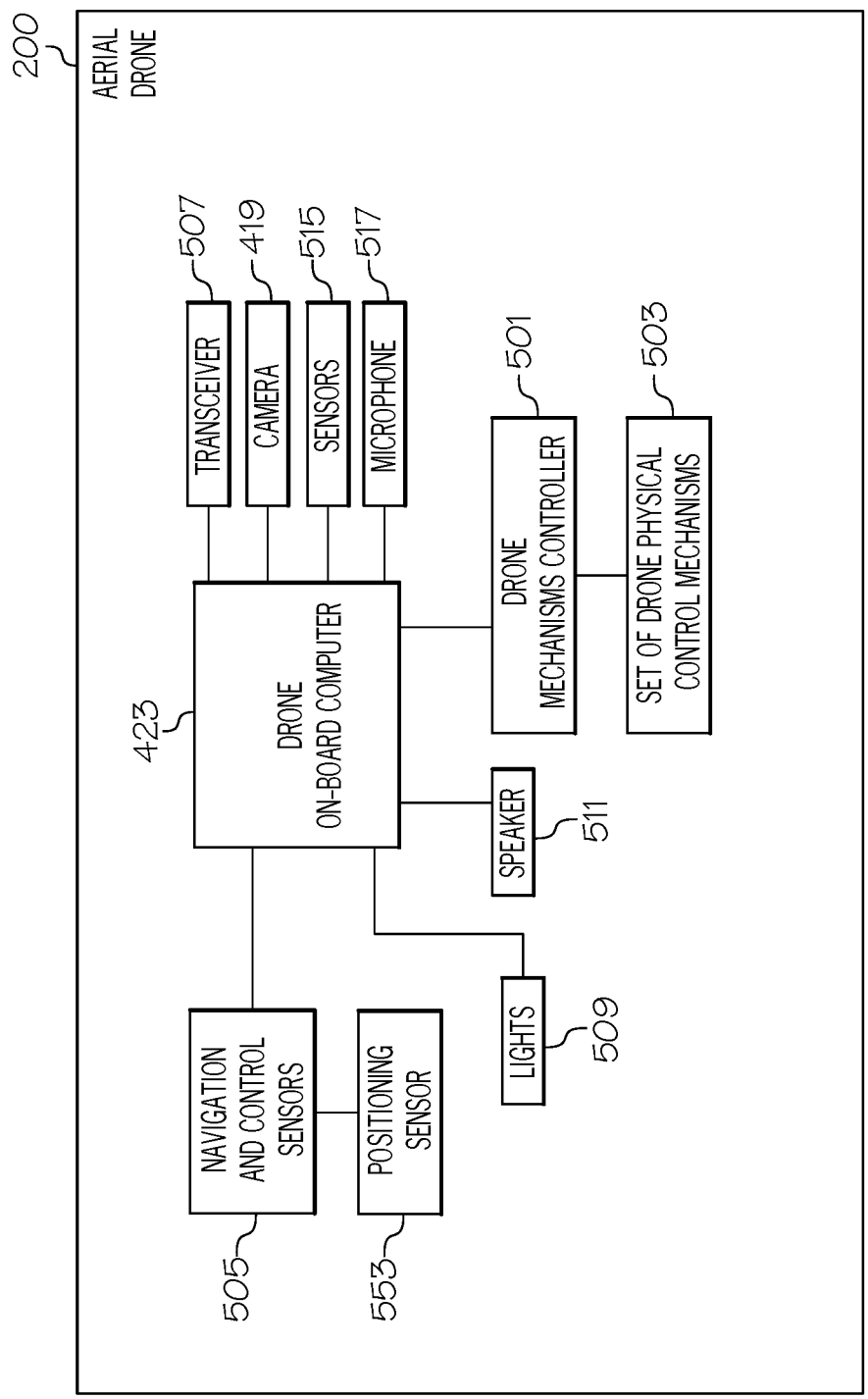
FIG. 5 illustrates control hardware and other hardware features of the exemplary aerial drone shown in FIG. 4 in accordance with one or more embodiments of the present invention.

With reference now to FIG. 5, exemplary control hardware within the aerial drone 200 presented in FIG. 4 is depicted.

The drone on-board computer 423 depicted in FIG. 4 is able to control a drone mechanisms controller 501, which is a computing device that controls a set of drone physical control mechanisms 503. The set of drone physical control mechanisms 503 includes, but is not limited to, throttles for internal combustion engine 420 and/or electric motor 416, selectors for selecting gear ratios within the geared transmission 414, controls for adjusting the pitch, roll, and angle of attack of propellers such as propeller 410 and other controls used to control the operation and movement of the aerial drone 200 depicted in FIG. 4.

Whether in autonomous mode or remotely-piloted mode, the drone on-board computer 423 controls the operation of aerial drone 200. This control includes the use of outputs from navigation and control sensors 505 to control the aerial drone 200. Navigation and control sensors 505 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 423, combined with positioning sensor 553 (e.g., accelerometers, global positioning system (GPS) sensors, altimeters, etc.). That is, positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors (i.e., positioning sensor 553) such as accelerometers (which measure changes in direction and/or speed by an aerial drone in any direction in any of three dimensions), speedometers (which measure the instantaneous speed of an aerial drone), airflow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 423 may utilize radar or other electromagnetic energy that is emitted from an electromagnetic radiation transmitter (e.g., transceiver 507 shown in FIG. 5), bounced off a physical structure (e.g., a building, bridge, or another aerial drone), and then received by an electromagnetic radiation receiver (e.g., transceiver 507). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 423.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 4) on the aerial drone 200 and/or the positioning system 151 discussed above.

With respect to the feature of (4) providing any other inputs needed to safely control the movement of the aerial drone 200, such inputs include, but are not limited to, control signals to direct the aerial drone 200 to make an emergency landing, etc.

Also on aerial drone 200 in one or more embodiments of the present invention is the camera 419 also shown in FIG. 4, which is capable of sending still or moving visible light digital photographic images (and/or infrared light digital photographic images) to the drone on-board computer 423. These images can be used to determine the location of the aerial drone 200 (e.g., by matching to known landmarks), to sense other drones/obstacles, and/or to determine speed (by tracking changes to images passing by) of the aerial drone.

Also on aerial drone 200 in one or more embodiments of the present invention are sensors 515. Examples of sensors 515 include, but are not limited to, air pressure gauges, microphones, barometers, chemical sensors, vibration sensors, etc., which detect a real-time operational condition of aerial drone 200 and/or an environment around aerial drone 200. Another example of a sensor from sensors 515 is a light sensor, which is able to detect light from other drones, street lights, home lights, etc., in order to ascertain the environment in which the aerial drone 200 is operating.

Also on aerial drone 200 in one or more embodiments of the present invention are lights 509. Lights 509 are activated by drone on-board computer 423 to provide visual warnings, alerts, etc.

Also on aerial drone 200 in one or more embodiments of the present invention is a speaker 511. Speaker 511 is used by drone on-board computer 423 to provide aural warnings, alerts, etc.

Also on aerial drone 200 in one or more embodiments of the present invention is a microphone 517. In an embodiment, microphone 517 is an omnidirectional sensor that measures ambient noise (e.g., sound produced by the aerial drone 200). In the same or another embodiment, microphone 517 is a directional microphone (e.g., that captures sounds at some distance away from the aerial drone 200).

Figure 6:
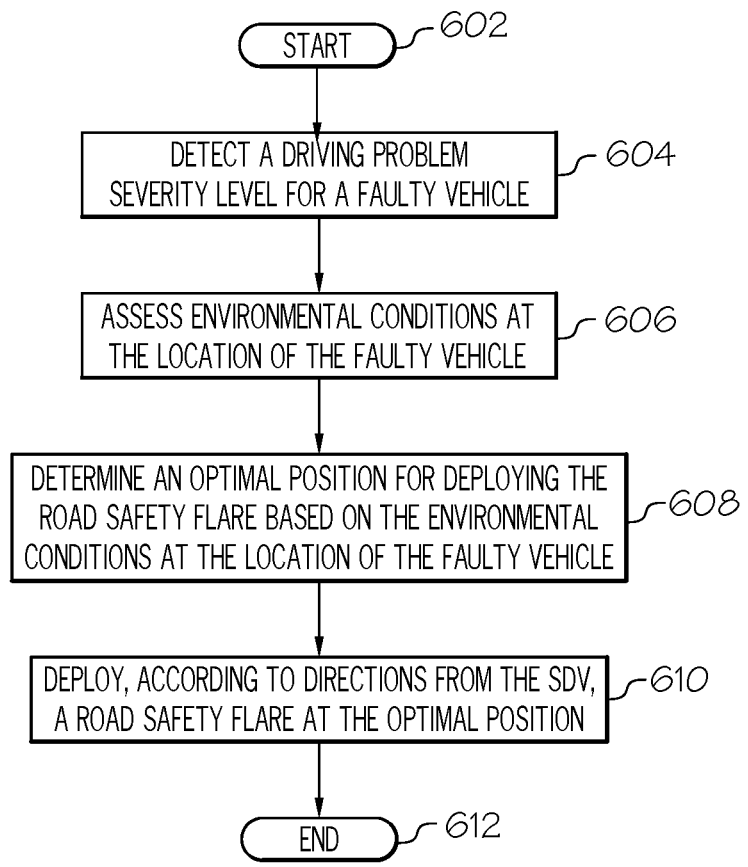
FIG. 6 is a high-level flow chart illustrating a process in accordance with one or more embodiments of the present invention.

With reference now to FIG. 6, a high-level flow chart illustrating a process in accordance with one or more embodiments of the present invention is presented.

After initiator block 602, one or more processors (e.g., within SDV 202 and/or SDV/drone controller system 201 shown in FIG. 2) detect a driving problem severity level for a faulty SDV (e.g., faulty SDV 202 shown in FIG. 2), as described in block 604. That is, a vehicle that is disabled on a roadway due to a mechanical breakdown or a driver being incapacitated is detected by the SDV 202 and/or the SDV/drone controller system 201. This detection may be made visually (e.g., using video images captured by the SDV 202 traveling near and/or SDV/drone controller system 201 mounted near the faulty SDV 202), electronically (based on distress radio signals being sent from a transmitter within the faulty SDV 202), etc.

For example, assume that some or all of the architecture shown in FIG. 3 is in faulty SDV 202. As such, faulty SDV 202 is able not only to report on mechanical problems within faulty SDV 202, but also any incapacity problems associated with a driver of the faulty SDV 202.

As described in block 606, one or more processors assess environmental conditions at the location of the faulty SDV. That is, sensors on the SDV 202 and/or the aerial drone 200 will detect traffic conditions, weather conditions, roadway conditions, etc. around the faulty SDV 202.

As described in block 608, one or more processors then determine an opportune position for deploying the road safety flare (e.g., the optimal distance 208 behind the faulty SDV 202) based on the environmental conditions at the location of the faulty SDV.

As described in block 610, the SDV 202 then issues directions to deploy the road safety flare at the opportune position.

The flow-chart ends at terminator block 612.

In an embodiment of the present invention, the directions from the SDV 202 to deploy the road safety flare at the opportune position are issued to the SDV 202 itself (e.g., from the SDV on-board computer 301 to the road safety flare deployment system 343 shown in FIG. 3).

In an embodiment of the present invention, the directions from the SDV 202 to deploy the road safety flare at the opportune position are issued to the aerial drone 200 shown in FIG. 4. That is, the SDV 202 will transmit a wireless signal to the drone on-board computer 423 and/or the road safety flare support system controller 424 shown in FIG. 4 to deploy the road safety flare at the opportune position.

In an embodiment of the present invention in which the SDV 202 and/or other systems are able to control the operation of the aerial drone 200, one or more processors (e.g., within aerial drone 200) are able to detect a presence of airborne hazards above the opportune position. That is, sensors on aerial drone 200 are able to detect smoke or hazardous gasses (e.g., using environmental sensor 430 shown in FIG. 4 when configured to detect the presence of certain gasses), other flying objects such as other aerial drones (e.g., using camera 419 shown in FIG. 4), etc. that are in the airspace above the faulty SDV 202. The processor(s) then determine a safe altitude (e.g., above the airspace in which the hazardous gases, other drones, overhead obstructions such as bridges, tree branches, etc. exist) from which to deploy the road safety flare from the aerial drone. That is, the safe altitude, which is determined based on the presence of airborne hazards above at the opportune position, is the altitude above or below these airborne hazards. These regions (above or below the airborne hazards) are deemed to be the safe altitude. The processors then position the aerial drone at this safe altitude above the opportune position, in order to keep the aerial drone safe.

In an embodiment of the present invention, the severity level (for the faulty SDV) is based on hazards posed by the faulty SDV itself, such as the faulty SDV about to come to a stop (the faulty SDV imminently stopping), how much danger is posed to other vehicles by the faulty SDV being disabled on the roadway (a risk estimation of a risk presented by the faulty SDV while the faulty SDV is disabled on a road), what types of hazards (fire, explosion, traffic blockage) will be caused by an engine malfunction in the faulty SDV, a radiator malfunction in the faulty SDV, an electrical malfunction in the faulty SDV, a flat tire on the faulty SDV, and/or an accident involving the faulty SDV, etc.

In an embodiment of the present invention, the severity level (for the faulty SDV) is based on a safety hazard to an occupant of the faulty SDV. That is, in addition to (or rather than) determining the severity level for the faulty SDV based on what types of hazards/exposures the faulty SDV poses to other vehicles, the system will determine how much danger occupants of the faulty SDV are in, and use this information to determine if and how to deploy the road safety flare. That is, if the occupant of the faulty SDV is merely stopping briefly on the side of the road (e.g., to make a phone call while parked), then no road safety flares are needed. However, if the occupant of the faulty SDV is having a heart attack (as detected by biometric sensors within the cabin of the faulty SDV), then one or more road safety flares will be deployed around the faulty SDV.

In accordance with various embodiments of the present invention, the road safety flare may be an electronic safety flare (e.g., a battery-operated light emitting diode (LED) device), a pyrotechnic safety flare (e.g., a solid fuel flare that is ignited by pulling off ignition tape), a radio signal transmitting safety flare (e.g., a device that broadcasts a warning signal to any radio receiver within a predetermined range, e.g., 500 feet), etc. That is, in the embodiment in which the road safety flare is a radio signal transmitting safety flare, the radio signal transmitting safety flare will broadcast a signal (e.g., a loud tone) across multiple radio frequencies, which are picked up on radio receivers in oncoming vehicles, which cause the loud tone to be generated by speakers in the cabin of the oncoming vehicles.

In an embodiment of the present invention, assume that the faulty SDV is on a roadway. In such an embodiment, the SDV may deploy the road safety flare directly onto the roadway in order to deploy the road safety flare from the SDV at the opportune position.

However, in another embodiment, the road safety flare is mounted to a remotely-maneuverable rolling platform (e.g., rolling platform 212 shown in FIG. 2). Thus, in this embodiment, the SDV will first deploy the remotely-maneuverable rolling platform with the road safety flare mounted thereon onto the roadway. One or more processors (e.g., within SDV 202 and/or SDV/drone controller system 201) will then remotely control the remotely-maneuverable rolling platform with the road safety flare mounted thereon to the opportune position.

Figure 7:
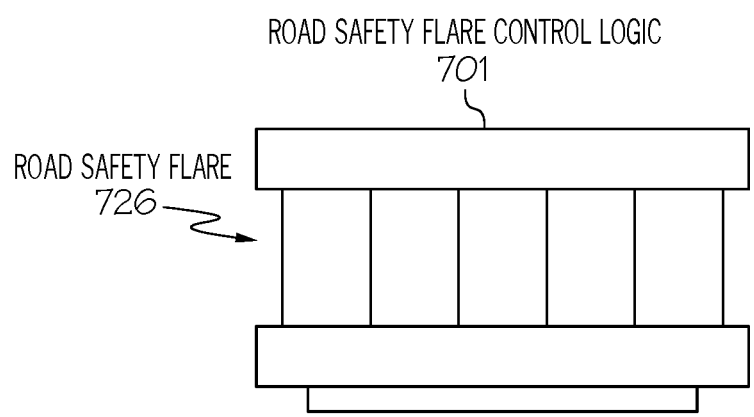
FIG. 7 illustrates a road safety flare with associated road safety flare control logic in accordance with one or more embodiments of the present invention.

In an embodiment of the present invention, assume that the road safety flare is equipped with a communication system that electronically communicates with the SDV. For example, as shown in FIG. 7, a road safety flare 726 (analogous to one of the road safety flares 226 shown in FIG. 2) is attached to a road safety flare control logic 701. Road safety flare control logic 701 is able to control electronics within road safety flare 726 (if road safety flare 726 is an electronic road safety flare), pull the fuse tape off of the road safety flare 726 (if the road safety flare 726 is a pyrotechnic safety flare) using an electromechanical fuse puller, etc. Thus, in this embodiment, the SDV receives a message from the communication system (part of the road safety flare control logic 701) on the road safety flare describing a real-time state of the road safety flare. The SDV, based on the real-time state of the road safety flare, adjusts a functionality of the road safety flare by a remote transmission from the SDV to the communication system on the road safety flare.

That is, assume that the road safety flare 726 is an electronic flare that is in bidirectional communication with the SDV. The SDV may then control the operation of the electronic flare by changing the strobing, coloration, etc. of the electronic flare. This change in operation of the electronic flare may also indicate 1) the state of the faulty SDV and/or 2) the state of the electronic flare. That is, if the faulty SDV has been disabled for more than one hour, then the electronic flare may change from a fast flashing strobe to a slower flashing strobe. Similarly, if the electronic flare is running low on battery power, has been struck by a vehicle, etc., then the color, strobe rate, brightness, etc. of the LEDs in the electronic flare may change accordingly.

In one or more embodiments of the present invention in which multiple road safety flares 226 are deployed, the SDV 202 and/or aerial drone 200 may place them in different patterns based on the severity level. That is, if the severity level (discussed above) is moderate, then the road safety flares 226 may be deployed in a straight line every ten feet. However, if the severity level is high, then the road safety flares 226 may be deployed in a zigzag pattern every two feet.

As described herein, the environmental conditions upon which the opportune position for deploying the road safety flare(s) is based may be current traffic conditions at the location of the faulty SDV, current weather conditions at the location of the faulty SDV, current ambient lighting conditions at the location of the faulty SDV, etc.

Thus, as described herein and in various embodiments of the present invention, a self-driving vehicle (SDV) detects a driving problem severity level, and, then, based on a severity of the level, the system deploys one or more road safety flares.

Flare selection and/or deployment may proceed during a breakdown process being experienced by the faulty SDV. Deployment of the flare occurs when the likelihood of a failure over the time interval required to deploy the flare reaches a threshold. The flare deployment may further be precisely timed to provide a determined spacing between the flare and the vehicle upon stopping. The spacing may be a function of 1) road conditions, 2) road curvature, 3) average speed of vehicles on road, 4) weather, 5) time of day, 6) traffic conditions, etc. Multiple flares may be deployed during the breakdown in order to form a particular alerting visual pattern for approaching vehicles (such as a curved pattern to move vehicles away from the stopped faulty SDV). Movements of the faulty SDV prior to breakdown can be coordinated for proper flare placement. Flares may be mobile and their position adjusted in order to optimize their position after deployment.

In one or more embodiments of the present invention, the deployed road safety flare(s) are both bright and provide 360-degree illumination. As one example, the system may make use of 360-degree LED flares. As one example, in one flare unit, eleven white LEDs may flash rapidly in the front, followed by eleven red LEDs flashing rapidly in the back for 360-degree flashing. Some of the road safety flares may have magnets to allow for sticking to the SDV itself for use as a mounted flare or flashlight. When on the ground, various shapes may help keep the flare from rolling away.

In one or more embodiments of the present invention other vehicles (including other SDVs or emergency vehicles) may be equipped with real-time road flare detectors. For example, a flare detector may be configured to identify the colors of pixels, device shape, flashing/blinking pattern, etc. on a road safety flare deployed by a faulty SDV. Similarly, the road safety flares may emit an electronic (wireless) signal, in order to alert other vehicles in advance of reaching the faulty SDV.

In an embodiment of the present invention, the SDV (e.g., SDV 202) that has detected a driving problem (e.g., faulty SDV 202) communicates directly with "first responders" according to the problem detected and the severity of the problem (ambulance for medical emergency, police for accident, fire department for car fire, roadside assistance for flat tire, gas station when out of gas, etc.)

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
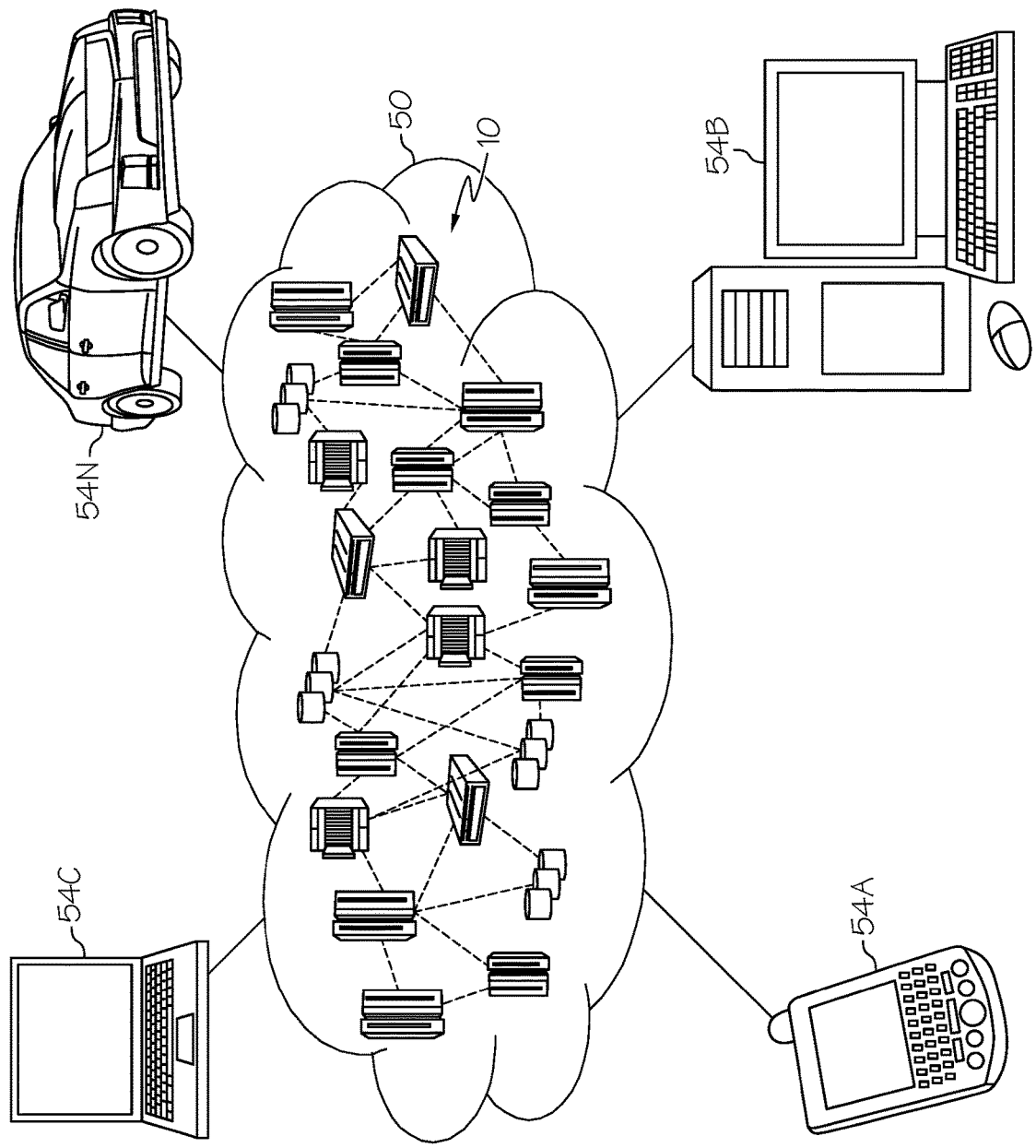
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
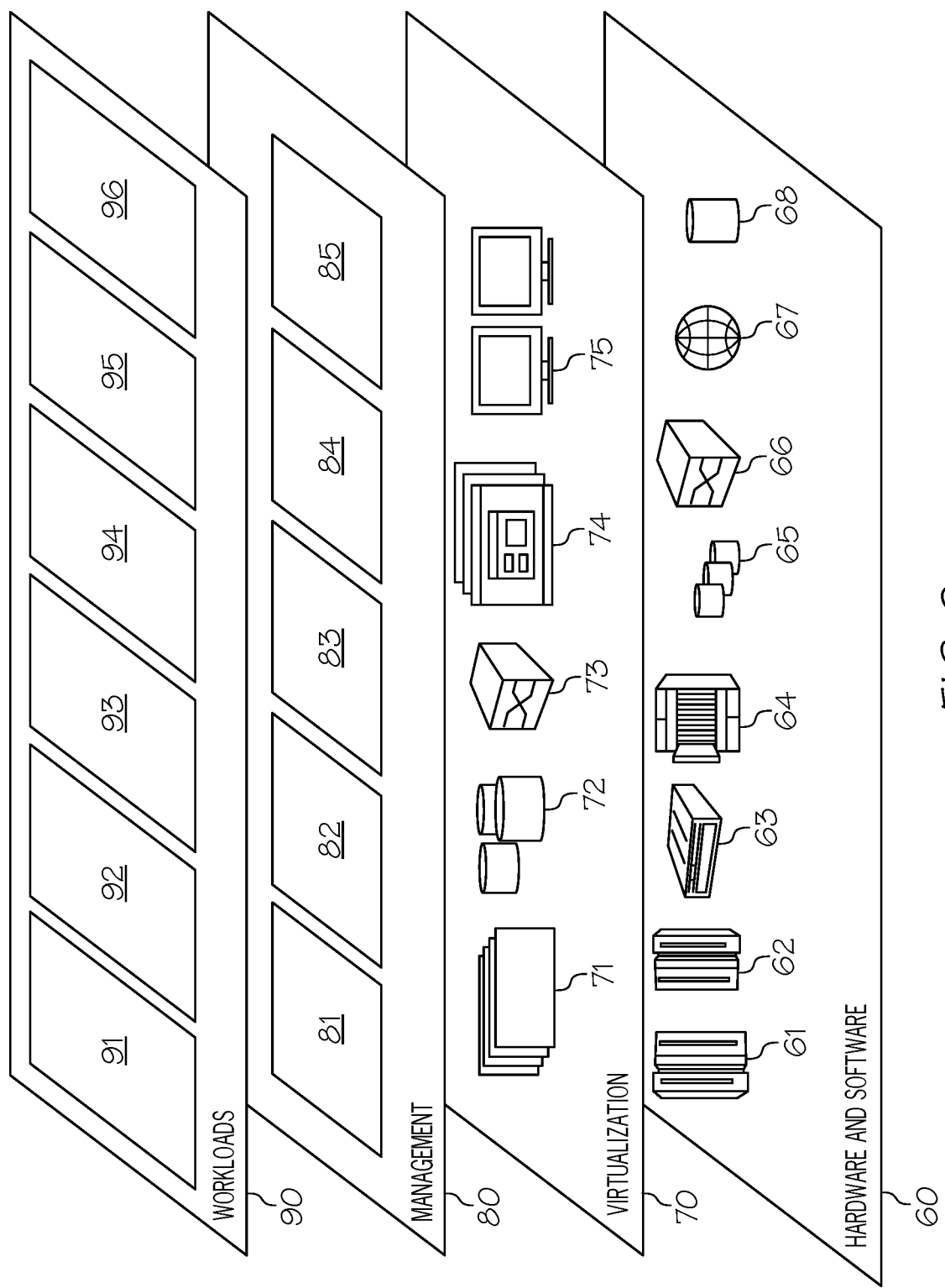
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and road safety flare deployment processing 96 for performing one or more functions in accordance with the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
deploying, by a faulty self-driving vehicle (SDV) to an opportune position, a remotely-maneuverable rolling platform, based on an amount of danger that is posed to other vehicles by the faulty SDV, wherein one or more road safety flares are coupled to the remotely-maneuverable rolling platform, and wherein the one or more road safety flares are equipped with a communication system that electronically communicates with the faulty SDV;
receiving, by the faulty SDV, a message from the communication system on the one or more road safety flares describing a real-time state of the one or more road safety flares; and
activating, by the faulty SDV and based on the real-time state of the one or more road safety flares, the one or more road safety flares by a remote transmission from the faulty SDV to the communication system on the one or more road safety flares.

2. The method of claim 1, further comprising:
detecting, by one or more processors, a driving problem severity level for the faulty SDV, wherein the driving problem severity level describes the amount of danger that is posed to the other vehicles by the faulty SDV, and wherein the driving problem severity level is based on a safety concern expressed by an occupant of the faulty SDV;
assessing, by one or more processors, environmental conditions at the location of the faulty SDV; and
determining, by one or more processors, the opportune position for deploying the one or more road safety flares by the faulty SDV based on the environmental conditions at the location of the faulty SDV and the driving problem severity level.

3. The method of claim 2, wherein the environmental conditions are from a group of conditions consisting of current traffic conditions at the location of the faulty SDV, current weather conditions at the location of the faulty SDV, and curvatures of a roadway at the location of the faulty SDV.

4. The method of claim 1, wherein the one or more road safety flares are from a group consisting of an electronic safety flare, a pyrotechnic safety flare, and a radio signal transmitting safety flare.

5. A computer program product for deploying one or more road safety flares at an opportune position near a faulty self-driving vehicle (SDV), the computer program product comprising a computer readable storage medium having program instructions embodied therewith, wherein the computer readable storage medium is not a transitory signal per se, the program instructions readable and executable by a processor to cause the processor to perform a method comprising:

deploying, by a faulty self-driving vehicle (SDV) to an opportune position, a remotely-maneuverable rolling platform based on an amount of danger that is posed to other vehicles by the faulty SDV, wherein one or more road safety flares are coupled to the remotely-maneuverable rolling platform, and wherein the one or more road safety flares are equipped with a communication system that electronically communicates with the faulty SDV;

receiving, by the faulty SDV, a message from the communication system on the one or more road safety flares describing a real-time state of the one or more road safety flares; and activating, by the faulty SDV and based on the real-time state of the one or more road safety flares, the one or more road safety flares by a remote transmission from the faulty SDV to the communication system on the one or more road safety flares.

6. The computer program product of claim 5, wherein the method further comprises:

detecting a driving problem severity level for the faulty SDV, wherein the driving problem severity level describes the amount of danger that is posed to the other vehicles by the faulty SDV, and wherein the driving problem severity level is based on a safety concern expressed by an occupant of the faulty SDV;

assessing environmental conditions at the location of the faulty SDV; and determining the opportune position for deploying the one or more road safety flares by the faulty SDV based on the environmental conditions at the location of the faulty SDV and the driving problem severity level.

7. The computer program product of claim 6, wherein the environmental conditions are from a group of conditions consisting of current traffic conditions at the location of the faulty SDV, current weather conditions at the location of the faulty SDV, and curvatures of a roadway at the location of the faulty SDV.

8. The computer program product of claim 5, wherein the one or more road safety flares are from a group consisting of an electronic safety flare, a pyrotechnic safety flare, and a radio signal transmitting safety flare.

9. The computer program product of claim 5, wherein the program code is provided as a service in a cloud environment.

10. A computer system comprising one or more processors configured to:

deploy, by a faulty self-driving vehicle (SDV) to an opportune position, a remotely-maneuverable rolling platform based on an amount of danger that is posed to other vehicles by the faulty SDV, wherein one or more road safety flares are coupled to the remotely-maneuverable rolling platform, and wherein the one or more road safety flares are equipped with a communication system that electronically communicates with the faulty SDV;

receive a message from the communication system on the one or more road safety flares describing a real-time state of the one or more road safety flares; and activate, based on the real-time state of the one or more road safety flares, the one or more road safety flares by a remote transmission from the faulty SDV to the communication system on the one or more road safety flares.

11. The computer system of claim 10, wherein the one or more processors are further configured to:

detect a driving problem severity level for the faulty SDV, wherein the driving problem severity level describes the amount of danger that is posed to the other vehicles by the faulty SDV, and wherein the driving problem severity level is based on a safety concern expressed by an occupant of the faulty SDV;

assess environmental conditions at the location of the faulty SDV; and determine the opportune position for deploying the one or more road safety flares by the faulty SDV based on the environmental conditions at the location of the faulty SDV and the driving problem severity level.

12. The computer system of claim 11, wherein the environmental conditions are from a group of conditions consisting of current traffic conditions at the location of the faulty SDV, current weather conditions at the location of the faulty SDV, and curvatures of a roadway at the location of the faulty SDV.

13. The computer system of claim 10, wherein the one or more road safety flares are from a group consisting of an electronic safety flare, a pyrotechnic safety flare, and a radio signal transmitting safety flare.

14. The computer system of claim 10, wherein the stored program instructions are provided as a service in a cloud environment.

* * * * *